United States Patent [19]

Müller

[11] Patent Number: 4,913,692
[45] Date of Patent: Apr. 3, 1990

[54] APPARATUS FOR PRESSING THE OVERLAPPED AREA OF A BLANK BEING FORMED INTO A JACKET

[75] Inventor: Berthold Müller, Süssen, Fed. Rep. of Germany

[73] Assignee: Michael Hörauf Maschinenfabrik GmbH & Co. KG, Donzdorf, Fed. Rep. of Germany

[21] Appl. No.: 293,425

[22] Filed: Jan. 4, 1989

[30] Foreign Application Priority Data

Mar. 22, 1988 [DE] Fed. Rep. of Germany ....... 3809489

[51] Int. Cl.$^4$ ................................................ B31B 1/64
[52] U.S. Cl. .................................. 493/133; 493/164; 493/134
[58] Field of Search ............... 493/105, 108, 134, 141, 493/164, 209, 142, 475, 102, 103, 104, 106, 107, 109

[56] References Cited

U.S. PATENT DOCUMENTS 2,089,722  8/1937  Vergobbi ........................... 493/164
2,125,414  8/1938  Baker ................................. 493/164

FOREIGN PATENT DOCUMENTS 2743838  11/1984  Fed. Rep. of Germany .

Primary Examiner—Frederick R. Schmidt
Assistant Examiner—Jack W. Lavinder
Attorney, Agent, or Firm—Burns, Doane, Swecker & Mathis

[57] ABSTRACT

An apparatus for producing container jackets from blanks comprises a winding core around which a blank is wound in a manner forming an overlapped area. A pressing element is arranged to engage and press the overlapped area. An actuating mechanism urges the pressing element against the overlapped area to apply a pattern of radial pressing forces along the length of the overlapped area. The actuating mechanism is able to longitudinally shift the pressing force pattern along the overlapped area to adapt the apparatus to the pressing of different types of jackets, such as jackets of different lengths.

11 Claims, 1 Drawing Sheet

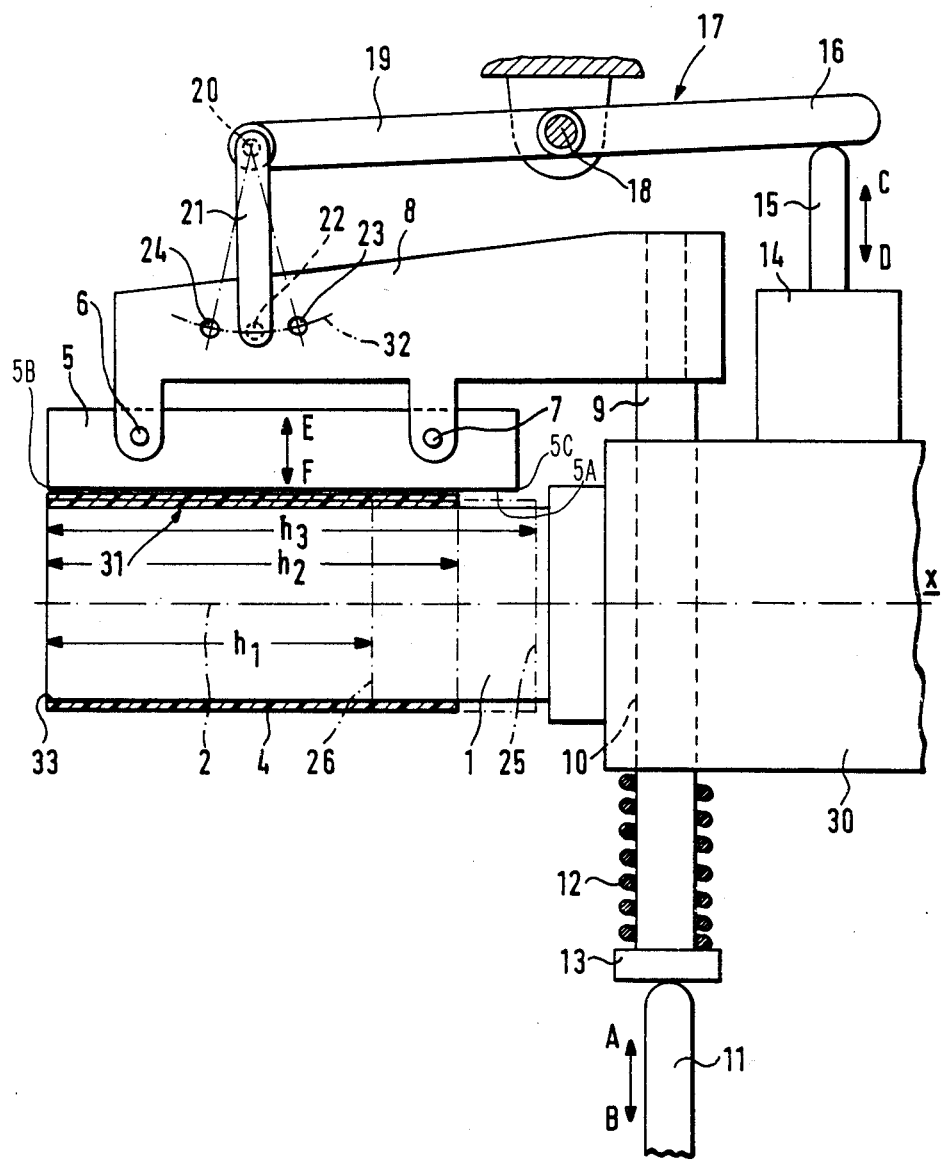

APPARATUS FOR PRESSING THE OVERLAPPED AREA OF A BLANK BEING FORMED INTO A JACKET

BACKGROUND OF THE INVENTION

The invention concerns an apparatus for the production of container jackets from flat blanks of cardboard or plastic.

An apparatus of this type is known (for example, see German Pat. No. 27 43 838), wherein a strip-like sealing head is provided which is pressed by a pneumatic cylinder against the overlapping area of a blank wound around a core. With such an arrangement, it is not always possible to align the contact pressure strip (serving as the sealing head) along a line parallel to the axis of the core, in order to obtain a contact pressure defined in all of the area. The possibility exists of displacing the strip by means of a rocker, but even then there is no assurance of an accurate alignment of the contact strip.

Other types of such machinery (e.g., cup machines of the Michael Horauf Co., West Germany) have a support for the contact strip which permit only movements radially to the axis of the winding core. The contact pressure is also applied by means of such support, which in actual practice is mounted under the winding core. That arrangement is chosen because the winding cores are components of a rotating table and therefore both the support and the drive elements are located in the vicinity of the rotating center of the rotating table radially inside of the winding cores, in order to keep the inertia forces low and for reasons of space. The fact that in such an arrangement the contact strip is loaded asymmetrically adversely affects the quality of the joint in the overlapped area of the blank.

Even if the afore-described mechanisms are configured to apply a uniform contact pressure along the length of the overlapped area for a given jacket structure, it is not possible to adjust the mechanism to continue applying a symmetrical pressure in the event of certain changes in the jacket format, such as a change in the longitudinal length of the jackets.

It is, therefore, an object of the invention to provide an apparatus of the afore-mentioned type such that, while retaining accurate guidance, it will be possible to apply force symmetrically to the contact strip even in the case of container jackets of different formats.

This object is attained by the present invention which comprises a winding core around which a blank is wound in a manner forming an overlapped area. A pressing element is arranged to engage and press the overlapped area along a length of that area parallel to a longitudinal axis of the jacket. An actuating mechanism urges the pressing element against the overlapped area in a radial direction with reference to the axis to apply a pattern of radial pressing forces along the length of the overlapped area. The actuating mechanism is able to longitudinally shift the pressing force pattern along the overlapped area to adapt the apparatus to the pressing of different types of jackets.

By means of this arrangement, the contact pressure may always be applied to the overlapped area. The point of pressure application may be displaced to conform to different jacket lengths, whereby a symmetrical application of pressure is always assured.

The pressing element is activated by means of a rocker arm which facilitates mounting of the apparatus into the area of the winding star. By varying the point of articulation of a pressure lever on a yoke holding the pressing element, the point of the application of the force may be shifted longitudinally in a very simple manner.

BRIEF DESCRIPTION OF THE DRAWING

The objects and advantages of the invention will become apparent from the following detailed description of a preferred embodiment thereof in connection with the accompanying drawings, in which like numerals designate like elements, and in which:

The single FIGURE is a schematic side elevational view of an arm of a winding star of an apparatus according to the invention.

DETAILED DESCRIPTION OF A PREFERRED EMBODIMENT OF THE INVENTION

The FIGURE shows part of a cylindrical winding core 1 having a round cross-section and defining an axis 2 which extends radially relative to the axis of rotation of a winding star, of which only a part 30 of one of its arms is shown.

A sleeve-like container jacket 4 is wound around the winding core 1. The container jacket 4 is wound from a flat blank of cardboard or plastic in a known manner. Following the winding, an overlapped area 31 of the jacket is obtained, in which the ends of the blank are in superposed relationship. These overlapping ends are to be joined together, for example by welding. For this purpose, the blank is usually exposed to hot air in the overlapped area.

The welding itself is carried out by a pressing element in the form of a contact pressure strip 5, shown in the FIGURE in a position raised from the container jacket. The contact pressure strip 5 may be moved linearly in the direction of the arrows E and F radially relative to the axis 2 of the winding core 1. By means of a pressing surface 5A of the contact pressure strip 5, the pressure required for the welding is supplied to the preheated container jacket 4 in the overlapped area 31. It is important to apply the pressure to the overlapping area 31 along a line oriented as parallel as possible to the axis 2.

To attain this objective, the contact pressure strip 5 is mounted by means of pivot pins 6 and 7 on a yoke 8, which in turn, is fastened to one or several guide rails 9. The single guide rail 9 shown in the FIGURE is supported in a sliding bearing 10 of the arm 30 of the winding star and may be reciprocated by means of a plunger 11 in directions A and B.

When urged in the direction of the arrow A, the yoke 8 and the contact pressure 5 mounted on it are raised from the container jacket and occupy the position shown in the FIGURE. The guide rail 9 and the bore 10 are oriented so that the yoke 8 and the pressure strip 5 attached to it are guided exactly radially to the axle 2 of the winding core 1. The guide further has an arrangement such that the contact pressure strip 5 is aligned accurately parallel to the axis 2 of the container jacket 4.

If the plunger 11 is retracted in the direction B, a helical spring 12 mounted on a guide rod 9 displaces the guide rod 9 downwardly. That spring is supported, on the one hand, against a stop 13 of the rod 9, and on the other hand, against a corresponding stop surface on the arm 30 of the winding star, thereby biasing the pressure strip 5 radially toward the winding core 1. However, the load applied by the helical spring 12 is acting asymmetrically on the pressure strip 5, whereby a uniform contact pressure of the strip 5 against the jacket cannot be easily achieved by the spring.

The contact pressure is therefore applied during welding by a pneumatic cylinder unit 14, which is mounted on the winding star or the rotating table. The piston 15 of the pneumatic cylinder unit 14 may be moved in the direction C or D. The pressure of the piston-cylinder unit 14 may thus be varied in keeping with the operating conditions and the prevailing formats of the container 4.

The piston 15 of the cylinder unit 14 is acting against one arm of a two-arm lever 17 supported by a pivot 18 located, for example, on the winding star. A contact lever 21 is articulated on the other arm 19 of the two-arm lever 17 by a pin 20. The contact lever is articulated in a bore 22 of the yoke 8. The yoke 8 is further provided with two additional bores 23 and 24, which together with the bore 22, are located on a circular arc 32 extending around the pivot 20. A short connecting bolt of the contact lever 21 may be inserted selectively into one of the bores 22, 23 or 24, whereby the contact lever is able to alternatively assume one of the positions indicated by broken lines. It is thus possible to longitudinally vary the point of application of the load applied by the cylinder unit 14 to the yoke 8 relative to the ends 5B, 5C of the pressing surface 5A and, thus longitudinally shift the pressing force pattern applied by the pressure strip to the overlapped area.

It is thus possible to produce container jackets 4 of different lengths $h_1$, $h_2$, $h_3$, wherein a symmetrically distributed contact pressure parallel to the axis 2 is obtained by means of the same contact pressure apparatus.

In the position shown, the contact pressure 21 is engaging the center bore 22, which is located midway of the height $h_2$ of the container jacket 4 and is thus located at the center of the generating line of the container jacket 4. If longer container jackets with a length $h_3$ are produced, the contact pressure lever 21 is inserted in the bore 23, which is located midway of the associated generating line of the longer blank. In the production of shorter container jackets, with a length of $h_1$, the contact pressure lever 21 is inserted into the bore 24. It would obviously be also possible to provide a sliding guide extending along the circular arc 32 to provide an infinite number of adjustments. In actual practice, however, the provision of individual guide bores has proved to be entirely adequate.

Although the present invention has been described in connection with a preferred embodiment of the invention, it will be appreciated by those skilled in the art that additions, modifications, substitutions and deletions not specifically described may be made without departing from the spirit and scope of the invention, as defined in the appended claims.

What is claimed is:

1. Apparatus for producing container jackets from blanks, comprising:
   a winding core around which a blank is wound to form a blank overlapped area which is to be bonded,
   pressing means including a pressing surface arranged to engage and press said overlapped area along a length of such area disposed parallel to a longitudinal axis of said jacket, said pressing surface including longitudinally spaced ends, and
   actuating means for applying a force to said pressing means at a force transmitting zone thereof for urging said pressing surface against said overlapped area in a radial direction with reference to said axis to apply a pattern of radial pressing forces along the length of said overlapped area,
   said actuating means including shifting means for longitudinally shifting the location of said force transmitting zone relative to said longitudinally spaced ends of said pressing surface and thereby longitudinally shift the pressing force pattern along said overlapped area to adapt said apparatus to the pressing of different types of jackets.

2. Apparatus according to claim 1 including means for guiding said pressing means for linear movement toward and away from said core in said radial direction.

3. Apparatus according to claim 1, wherein said actuating means comprises a motor-driven member, said shifting means comprising a link having a first end pivotably attached by first pivot means to said member and a second end pivotably attached by second pivot means to one of a plurality of coupling points on said pressing means.

4. Apparatus according to claim 3, wherein said coupling points are spaced along an arc having a radius equal to a distance between said first and second pivot means.

5. Apparatus according to claim 3, wherein said motor-driven member comprises a lever pivotably mounted intermediate opposite ends thereof, one of said opposite ends being pivotably attached to said first end of said link and another of said opposite ends being motor driven.

6. Apparatus according to claim 3, wherein said pressing means comprises a pressing element including said pressing surface, and a holder connected to said pressing element at two longitudinally spaced force-transmitting points, said plurality of coupling points disposed on said holder longitudinally intermediate said force-transmitting points.

7. Apparatus for producing container jackets from blanks, comprising:
   a winding core around which a blank is wound to form a blank overlapped area which is to be bonded,
   a pressing element arranged to engage and press said overlapped area along a length of such area parallel to a longitudinal axis of said jacket,
   actuating means for urging said pressing element against said overlapped area in a radial direction with reference to said axis to apply a pattern of radial pressing forces along the length of said overlapped area,
   said actuating means including shifting means for longitudinally shifting the pressing force pattern along said overlapped area to adapt said apparatus to the pressing of different types of jackets,
   said actuating means including a holder connected to said pressing element at longitudinally spaced points, and means for applying a force to said holder for transmission to said pressing element through said points of connection, said shifting means comprising means for longitudinally moving a place where said force is applied to said holder,
   said actuating means including a guide carrying said holder, said guide mounted for movement in a radial direction with reference to said axis, and
   carrying means carrying said winding core, said carrying means including a bore extending radially with reference to said axis, said guide comprising a rod slidably mounted for reciprocation in said bore, said actuating means including a spring and a motor driven device for displacing said rod in different directions in said bore.

8. Apparatus for producing container jackets from blanks, comprising:
- a winding core around which a blank is wound to form a blank overlapped area which is to be bonded,
- a pressing element arranged to engage and press said overlapped area along a length of such area parallel to a longitudinal axis of said jacket, and
- actuating means for urging said pressing element against said overlapped area in a radial direction with reference to said axis to apply a pattern of radial pressing forces along the length of said overlapped area,
- said actuating means including shifting means for longitudinally shifting the pressing force pattern along said overlapped area to adapt said apparatus to the pressing of different types of jackets,
- said actuating means including a holder connected to said pressing element at longitudinally spaced points, and means for applying a force to said holder for transmission to said pressing element through said points of connection, said shifting means comprising means for longitudinally moving a place where said force is applied to said holder,
- said actuating means comprising a fluid-driven cylinder unit and a linkage interconnecting said unit with said holder for transmitting said force from said unit to said place on said holder,
- said linkage comprises a member pivotably connected at one end to said holder, and a two-arm pivoted lever, a first arm of said lever pivotably connected to the other end of said member, and a second arm of said lever arranged to be acted on by said unit.

9. Apparatus according to claim 8, wherein said holder includes a plurality of longitudinally spaced connecting means to which said one end of said member is selectively connected for longitudinally shifting the pressing force pattern applied by said pressing element.

10. Apparatus according to claim 9, wherein said plurality of connecting means comprises a plurality of holes.

11. Apparatus according to claim 9, wherein said holes are oriented in an arc, the center of which is defined by a pivot connection between said second arm and said other end of said member.

* * * * *